(12) United States Patent
Gygax et al.

(10) Patent No.: US 8,150,052 B2
(45) Date of Patent: Apr. 3, 2012

(54) INTEGRATING ACOUSTIC ECHO CANCELLATION AS A SUBSYSTEM INTO AN EXISTING VIDEOCONFERENCE AND TELEPRESENCE SYSTEM

(75) Inventors: Otto A. Gygax, Philomath, OR (US); Deqing Hu, Corvallis, OR (US); Joseph Davis, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 12/252,298

(22) Filed: Oct. 15, 2008

(65) Prior Publication Data
US 2010/0092003 A1    Apr. 15, 2010

(51) Int. Cl.
    *H04B 3/20* (2006.01)
(52) U.S. Cl. ............................ 381/66; 381/96; 348/14.08
(58) Field of Classification Search .................... 381/66, 381/96; 348/14.08
    See application file for complete search history.

(56) References Cited

U.S. PATENT DOCUMENTS

| | | | | |
|---|---|---|---|---|
| 7,155,018 | B1 * | 12/2006 | Stokes et al. ................. | 381/66 |
| 7,667,728 | B2 * | 2/2010 | Kenoyer et al. ............ | 348/14.08 |
| 7,720,232 | B2 * | 5/2010 | Oxford ......................... | 381/66 |
| 7,720,236 | B2 * | 5/2010 | Oxford ......................... | 381/96 |
| 7,760,887 | B2 * | 7/2010 | Oxford ......................... | 381/66 |
| 7,769,186 | B2 * | 8/2010 | Stokes et al. ................. | 381/66 |
| 7,903,137 | B2 * | 3/2011 | Oxford et al. ............ | 348/14.01 |
| 7,970,151 | B2 * | 6/2011 | Oxford et al. ............... | 381/92 |
| 2006/0093128 | A1 * | 5/2006 | Oxford .................... | 379/406.01 |
| 2006/0104458 | A1 * | 5/2006 | Kenoyer et al. ............... | 381/92 |
| 2006/0239443 | A1 * | 10/2006 | Oxford et al. .......... | 379/406.01 |
| 2006/0262942 | A1 * | 11/2006 | Oxford ........................ | 381/66 |
| 2006/0269074 | A1 * | 11/2006 | Oxford ........................ | 381/59 |
| 2006/0269080 | A1 * | 11/2006 | Oxford et al. ................ | 381/92 |
| 2009/0316923 | A1 * | 12/2009 | Tashev et al. .................. | 381/66 |
| 2010/0092003 | A1 * | 4/2010 | Gygax et al. .................. | 381/66 |
| 2010/0135501 | A1 * | 6/2010 | Corbett et al. ................ | 381/58 |
| 2010/0157015 | A1 * | 6/2010 | Read ......................... | 348/14.08 |
| 2011/0019833 | A1 * | 1/2011 | Kuech et al. .................. | 381/66 |
| 2011/0176687 | A1 * | 7/2011 | Birkenes ...................... | 381/66 |
| 2011/0211037 | A1 * | 9/2011 | Gygax et al. ............. | 348/14.08 |
| 2011/0279634 | A1 * | 11/2011 | Periyannan et al. ....... | 348/14.09 |
| 2011/0279635 | A1 * | 11/2011 | Periyannan et al. ....... | 348/14.09 |
| 2011/0279636 | A1 * | 11/2011 | Periyannan et al. ....... | 348/14.09 |
| 2011/0279637 | A1 * | 11/2011 | Periyannan et al. ....... | 348/14.09 |
| 2011/0279638 | A1 * | 11/2011 | Periyannan et al. ....... | 348/14.09 |
| 2011/0279639 | A1 * | 11/2011 | Anand et al. ............. | 348/14.09 |
| 2011/0283203 | A1 * | 11/2011 | Periyannan et al. .......... | 715/753 |

FOREIGN PATENT DOCUMENTS

EP           1845699 A1 * 10/2007
WO    WO 2010044793 A1 *  4/2010

* cited by examiner

*Primary Examiner* — Laura Menz (57) ABSTRACT

The present invention is embodied in a computer-readable program in a computer-readable medium for upgrading a video conference system, the computer-readable program comprising acoustic echo canceling control software having an application programming interface. The acoustic echo canceling control software is implemented on a computer system that operates the video conference system and macros are configured to couple the acoustic echo canceling control software to hardware components of the video conference system and to interface with the application programming interface. The macros are user configurable for providing real time adjustments of echo canceling runtime parameters of the hardware components during a video conference session.

11 Claims, 7 Drawing Sheets

INTEGRATING ACOUSTIC ECHO CANCELLATION AS A SUBSYSTEM INTO AN EXISTING VIDEOCONFERENCE AND TELEPRESENCE SYSTEM

BACKGROUND

Acoustic echo cancellation is a critical component in videoconferencing and telepresense applications. It guarantees clear audio delivery between participating studios. Studio is a general term meaning a 'node' involved in the conference. Videoconferencing is a term which describes a conference between two or more parties that are physically separated and are communicating with each other by means of electronic audio and video. Telepresence is a similar concept that attempts to simulate being in a different physical location utilizing electronic audio and video, and additionally providing a means to manipulate the remote environment.

Acoustic echo cancellation (AEC) is a very important component of any modern videoconferencing or telepresence system. AEC guarantees clear audio for all participants of a videoconference or telepresence session. One type of acoustic echo cancellation system is a hardware system, which detects an acoustic echo in an audio system and attempts to remove the echo, or diminish its affect as much as possible. However, current hardware only solutions, once deployed, cannot be modified without upgrading the equipment.

DETAILED DESCRIPTION OF PREFERRED EMBODIMENT

In the following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1:
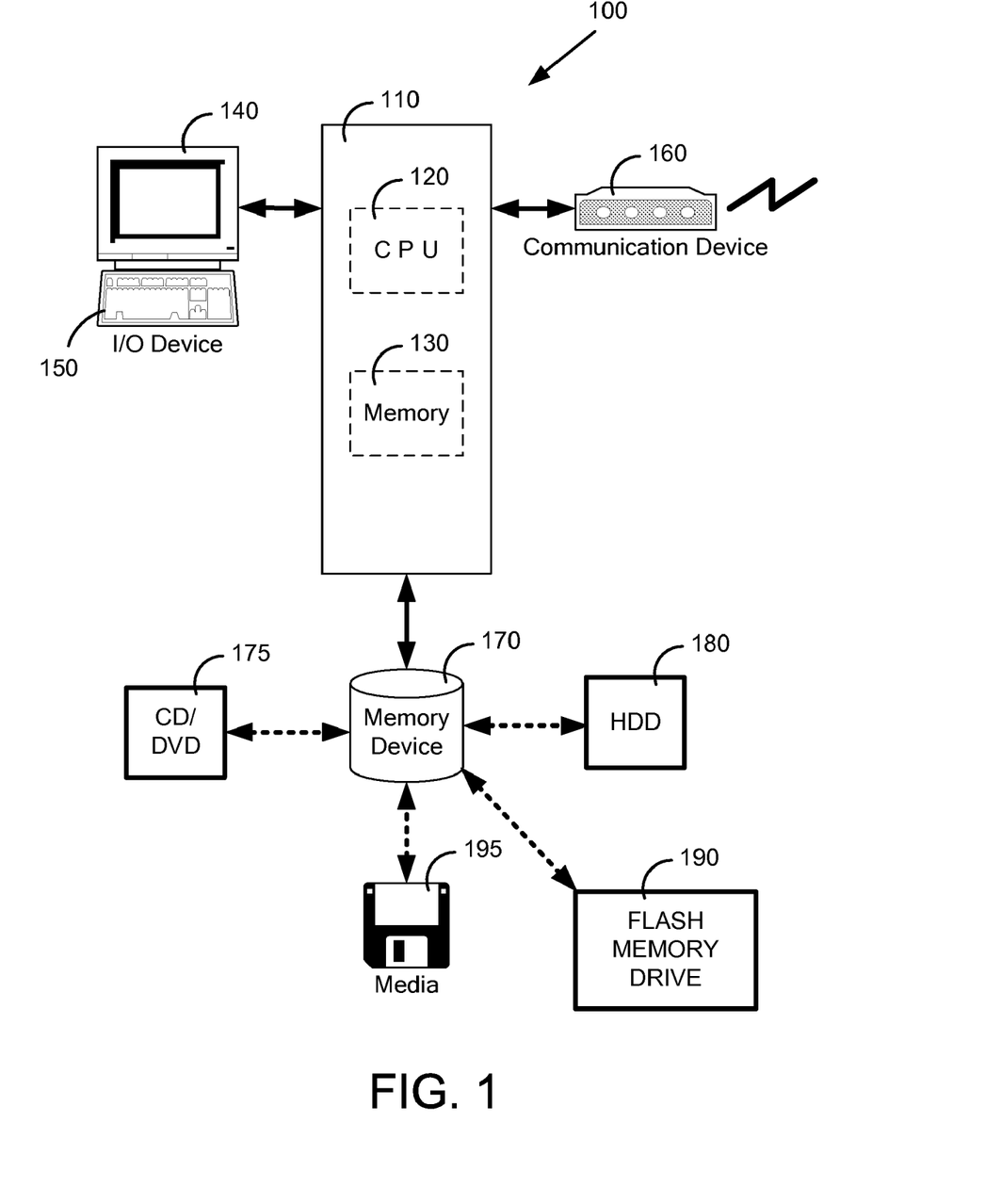
FIG. 1 illustrates a videoconferencing or telepresence system implemented in a host machine with computer readable medium in one embodiment of the present invention.

FIG. 1 illustrates a videoconferencing or telepresence system 100 implemented in a host machine in one embodiment of the present invention. The host machine includes a main computer 110 with a CPU 120 and memory 130, I/O devices with display device 140, key board 150 and so on, communication device 160 and memory devices 170 with CD/DVD 175, hard disk drive (HDD) 180, flash memory drive 190 and floppy drive (FD) 195.

Figure 2:
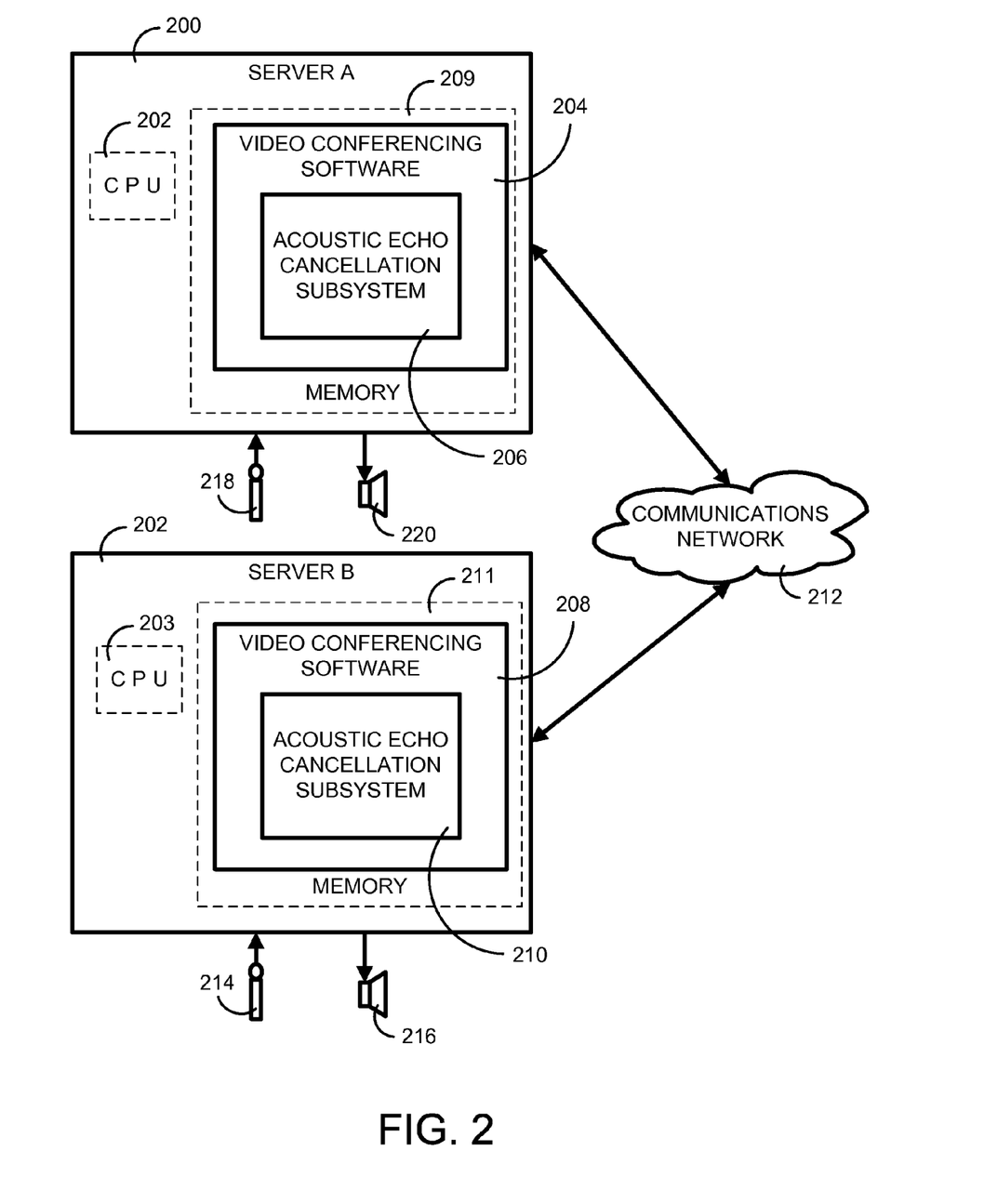
FIG. 2 represents an overview of one embodiment of a videoconferencing or telepresence system with two participating studios.

FIG. 2 represents an overview of one embodiment of a videoconferencing or telepresence system. An acoustic echo cancellation system, such as software based acoustic echo cancellation (AEC) systems 204 and 208 of respective memory devices 209 and 211, can use and integrate software acoustic echo cancellation subsystems 206 and 210 of one embodiment of the present invention for use in both servers 200 and 202 including respective CPUs 202 and 203 and having existing video conference systems operating on them. The software AEC subsystems 206 and 210 are cost effective, flexible, configurable and maintainable.

In one embodiment, as shown in FIG. 2, a session with two participating studios can be performed. In general, server 200 at the first location is a computer running the video conferencing software 204. One embodiment of the AEC subsystem 206 of the present invention is utilized by the video conferencing software 204 to provide echo cancellation during the conference. Server 100 is connected to network 212, which can be a private Intranet, the Internet, a telephone network, or other type of communications network. Video conferencing software 204 utilizes network 212 to communicate with other studios participating in the video conference session. Microphone 218 and speaker 220 are connected to server 200. Audio signals flowing into microphone 218 are processed by video conferencing software 204 and the AEC subsystem 206.

In one embodiment, server 202 at the second location is also running video conferencing software 208. AEC subsystem 210 is also utilized by video conferencing software 208. Server 202 is also connected to network 212 and utilizes the network to communicate with other studios participating in the conference session. Microphone 214 and speaker 216 are connected to server 202. Audio signals flowing into microphone 214 are processed by video conferencing software 208 and the AEC subsystem 206.

The video conferencing software systems 204 and 208 running on servers 200 and 202, respectively, are easily upgraded by AEC subsystems 206 and 210 to continuously encode analog audio signals entering their respective microphones 218 and 214 into a stream of digital data which they transmit to each other over network 212. Upon receiving the encoded digital audio data, video conferencing software 204 and 208 convert the data back into an analog audio signal and send it to their respective speakers 220 and 216.

In general, during the continuous processing of audio, AEC subsystems 206 and 210 analyze the audio signals entering respective microphones 220 and 216, as well as audio coming from the remote studio. A correction signal is generated by the AEC subsystems 206 and 210, which is delivered to video conferencing software 204 and 208 respectively. This correction signal is applied to the audio data stream by the video conferencing software to eliminate echo in the audio.

Figure 3:
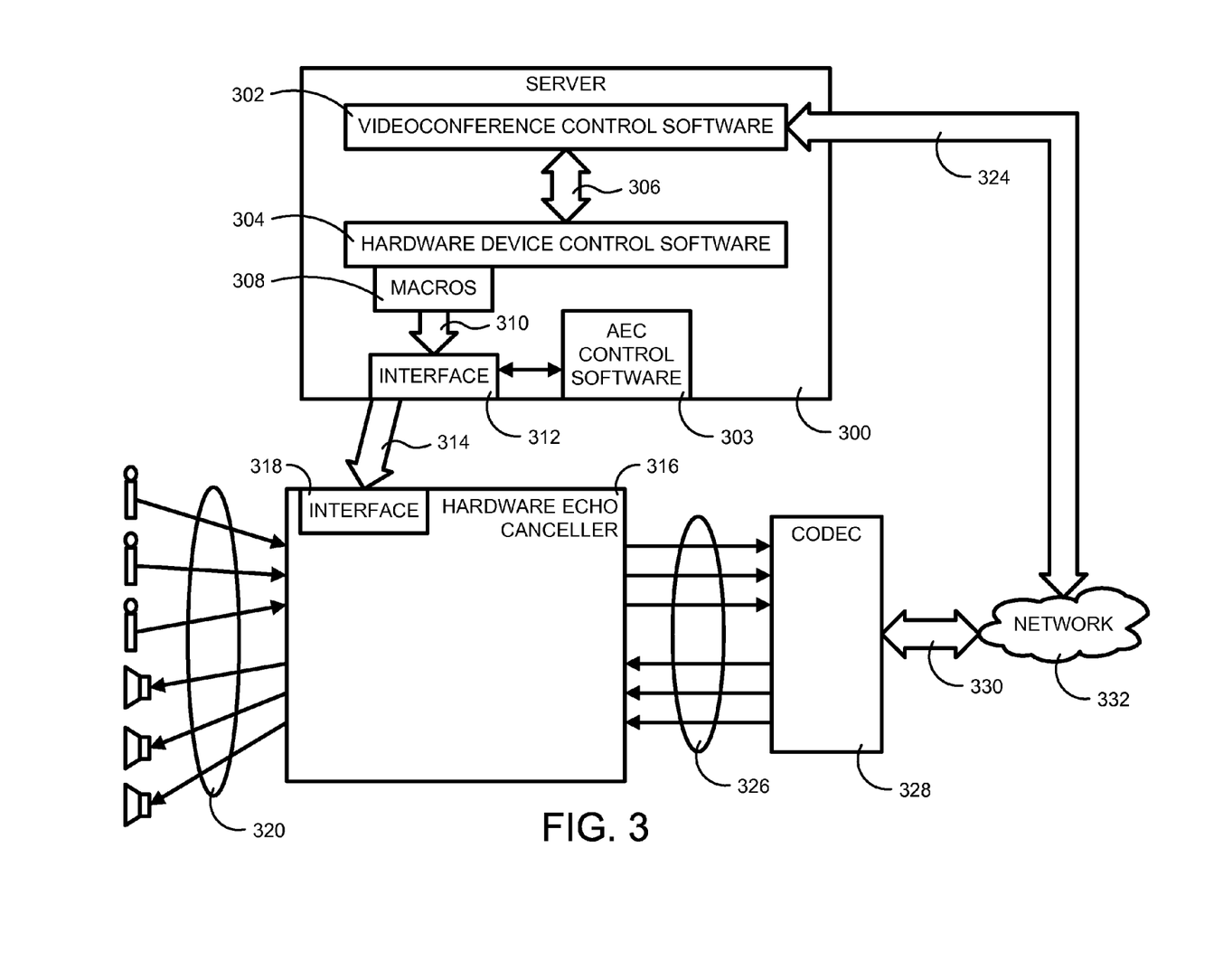
FIG. 3 is a block diagram representing a studio participating in a videoconference or telepresence session, utilizing a hardware based acoustic echo cancellation subsystem using control software of one embodiment of the present invention.

FIG. 3 is a block diagram representing a studio participating in a videoconference or telepresence session with an existing hardware based acoustic echo cancellation subsystem that uses control software of one embodiment of the present invention. Server 300 has video conferencing software 302 utilizing AEC control software 303 and hardware device control software 304. Hardware device control software 304 controls a hardware acoustic echo cancellation (AEC) subsystem 316. Hardware device control software 304 communicates with the hardware AEC subsystem 316 via hardware MACROS 308.

A MACRO is a command to perform some function and is utilized to control the acoustic echo cancellation system. A MACRO can be defined outside the scope of the software program. A MACRO provides a layer of indirection between the execution of a function and the actual implementation of that function. As such, whatever is actually performed by the MACRO can be redefined, and the software program can simply execute the MACRO without any knowledge of what the MACRO is actually doing.

Hardware MACROS 308 operate through an indirection layer 310 and a hardware interface 312. Indirection layer 310 is a layer that defines the hardware MACROS 308. Interface 312 communicates over communications channel 314 with interface 318 of hardware AEC subsystem 316. Communications channel 314 can be Universal Serial Bus (USB), Fire Wire, Ethernet, or some other means of data communications.

Hardware AEC subsystem 316 interfaces with audio I/O 320. Audio Inputs at interface 320 can be a microphone, or some other audio input device. Audio outputs at interface 320 can be speakers, headphones, or some other audio output device. Hardware AEC subsystem 316 implements digital I/O 326, digital audio signals travel over interface 326 to and from audio compression/decompression (codec) 328. The purpose of the codec 328 is to encode the audio stream into a format that consumes less bandwidth. Codec 328 also prepares the audio signals for transmission over a digital communications network.

Data stream 330 represents the encoded audio data. Encoded audio data 330 is sent and received from network 332 which communicates the data to and from other participants of the videoconferencing or telepresence session. Hardware AEC subsystem 316 continuously analyzes audio data from inputs 320 and inputs 326 and uses an algorithm to detect echoes, and generate a correction signal which it applies to its audio outputs 320 and 326. The correction signal is combined with the audio stream, and designed to eliminate echo from the audio.

In one embodiment, the AEC control software 303 of one embodiment of the present invention seamlessly integrates and upgrades the existing video conference control software 302 and hardware control software 304 when it is installed on server 300. The AEC control software 303 allows the existing video conference control software 302 and hardware control software 304 to be easily upgraded with minimal or near zero downtime, and zero development time. Implementation and operational details of AEC 203 are described in relation to FIGS. 4-6 below, which depicts exemplary systems utilizing the AEC software.

Figure 4:
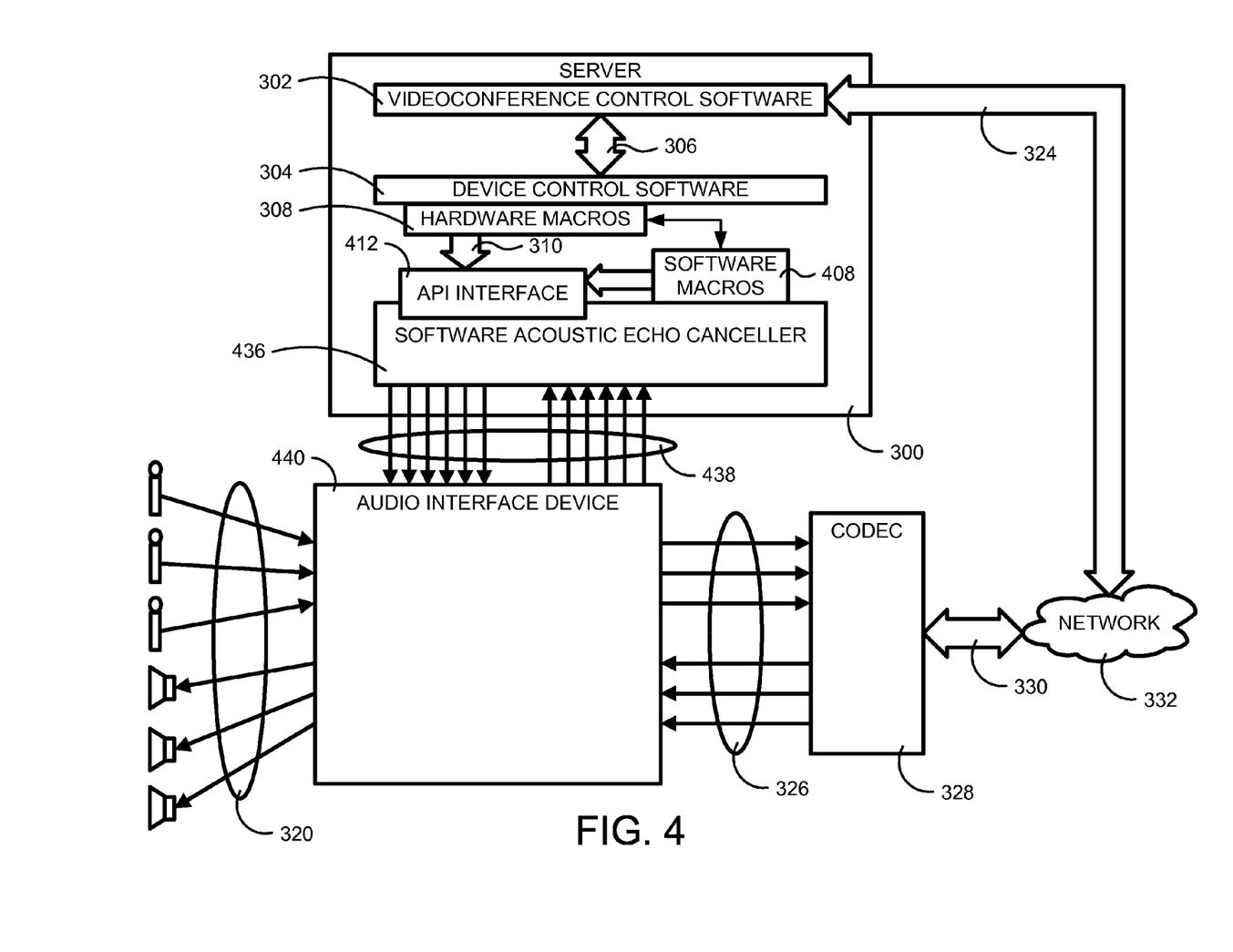
FIG. 4 is a block diagram representing a studio participating in a videoconference or telepresence session, utilizing a software based acoustic echo cancellation subsystem of one embodiment of the present invention.

FIG. 4 is a block diagram representing the studio of FIG. 3 participating in a videoconference or telepresence session, utilizing one embodiment of the present invention, namely a software based acoustic echo cancellation subsystem 436 similar to AEC 303 of FIG. 3, except software AEC 336 component is shown in FIG. 4 with an application programming interface (API) 412. When software AEC component 436 of one embodiment is installed on server 300, the MACRO indirection layer 310 communicates with the API 412. This allows user configurability and modification, as well as providing real time adjustments of echo canceling runtime parameters of the hardware components during a video conference session.

Software AEC component 436 communicates through interface 438 with generic audio I/O interface device 440. Audio I/O devices 320 connect with audio I/O interface 440, and can be input devices such as microphones and output devices such as speakers or headphones. Audio interface device 440 communicates via interface 326 with the audio codec 328. Interface 438 communicates with the software AEC 436 to seamlessly connect audio interface device 440 with server 300 and can be Universal Serial Bus (USB) Fire Wire, Peripheral Component Interconnect (PCI) or other data communication interface. Audio data travels to and from AEC software component 436, and is analyzed continuously by AEC software component 436. AEC Software component 436 generates a correction signal, which it mixes with the audio streams. The correction signal eliminates echoes in the audio streams.

Figure 5:
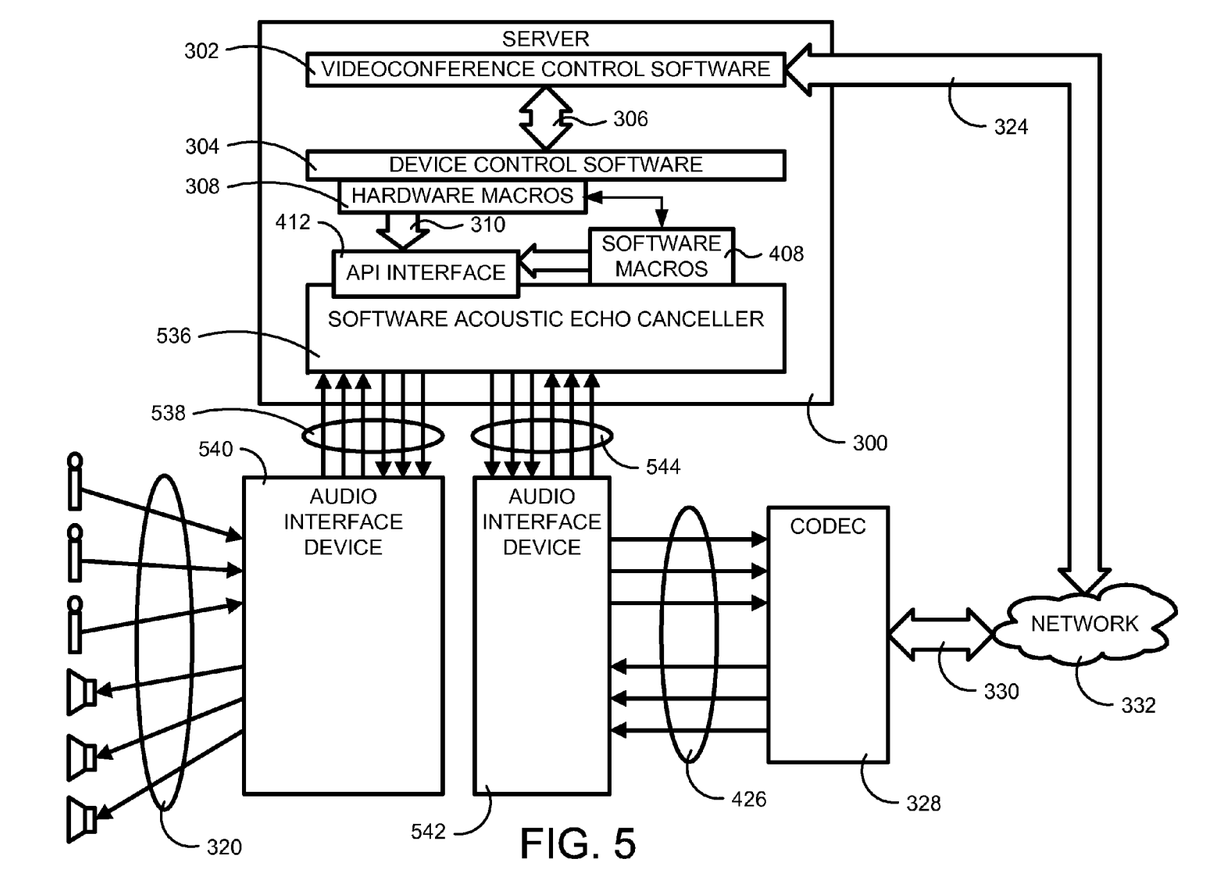
FIG. 5 is a block diagram a studio participating in a videoconference or telepresence session, utilizing a software based acoustic echo cancellation subsystem using multiple audio interface devices of one embodiment of the present invention.

FIG. 5 is a block diagram depicting the same studio involved in a videoconference or telepresence session as depicted in FIG. 4 with two (multiple) audio interface devices, 540 and 542. It is important to note that the addition of new audio interface devices will be detected automatically by software AEC component 536, which is similar to AEC 436, which will dynamically configure and utilize the new interface(s). In the configuration depicted by FIG. 5, local audio I/O is handled exclusively through audio interface device 540, which provides the interface to local audio I/O devices 520. Audio interface device 542 exclusively provides the audio I/O to codec 328 via interface 326.

The embodiments described in FIGS. 4 and 5 enable the integration of the software based acoustic echo cancellation system as a subsystem into an existing videoconference or telepresence architectures using APIs 412. The architecture and application programming interface (API) 412 of one embodiment of the present invention facilitates a near zero-downtime and zero-development integration with existing videoconference or Telepresence systems.

In one embodiment of the present invention, referring to FIGS. 4-5, the integration of the software acoustic echo cancellation subsystems 303, 436 or 536 into an existing hardware AEC-based videoconferencing or telepresence system is accomplished by using software MACROS 408 that are compatible hardware MACROS 308 with the hardware MACROS 308 that are already in use by the existing system. This allows a near zero-downtime upgrade solution with the software acoustic echo cancellation subsystems 303, 436 or 536, with minimal to no actual development time. Also, an existing hardware-based acoustic echo cancellation system can be easily upgraded to software acoustic echo cancellation subsystems 303, 436 or 536 through the complete replacement of the hardware MACROS 308 in the existing system with the new software MACROS 408.

For example, the macros (408 or 508) are new or replacement macros that have replaced old or initial or pre-existing hardware MACROS 308, of FIG. 3, configured to control a hardware based acoustic echo canceller. The software MACROS 408 of the present invention can have the same syntax as the hardware MACROS 308 to be replaced, but have new definitions for operating the acoustic echoing canceling software (436 or 536).

With regard to FIGS. 4 and 5, the APIs 412 of the present invention allow the software MACROS 408 with identical names as the existing hardware MACROS 308 to be replaced. Thus, upgrading to software acoustic echo cancellation subsystems 436 or 536 system can be accomplished by replacing the definitions of the existing hardware MACROS 308 with the software MACROS 408. After the hardware MACRO definitions are replaced, the videoconferencing or telepresence system can immediately begin utilizing the software acoustic echo cancellation subsystems 436 or 536 instead of existing inflexible hardware acoustic echo cancellation systems.

When using the APIs of FIGS. 4 and 5, the software acoustic echo cancellation subsystems 436 or 536 of the present invention provide the benefits of being a drop-in replacement for existing systems, and other benefits as well. Being software based, it offers virtually unlimited user control flexibility. The APIs 412 have plural command sets associated with the audio topology for adjusting real time runtime parameters to configure any audio topology as required by the videoconference or telepresence system. The command sets increase capabilities beyond that of the existing hardware acoustic echo cancellation systems.

Also, the parameters of the software acoustic echo cancellation subsystems 436 or 536 systems can be dynamically changed to reflect changes in the videoconferencing or telepresence requirements. The software acoustic echo cancellation subsystems 436 or 536 systems can also diagnose and troubleshoot unexpected states with minimal or no disruption to the ongoing session. The software acoustic echo cancellation subsystems 436 or 536 systems can also perform calibration adjustments to deliver the highest audio performance, and can intelligently recover to known working states.

In one exemplary embodiment, the video conferencing system 300 of FIG. 5 includes an audio interface device that is configured to transmit and receive audio signals. In another exemplary embodiment, the audio interface is two audio interfaces: (1) a first audio interface 540 that couples to a plurality of local audio input and output devices and to the acoustic echo cancelling software; and (2) a second audio interface 542 that couples to the acoustic echo canceling software 536 and to a codec 328. In another exemplary embodiment, the audio interface of FIG. 4 is a single unit 440 that performs the functions of the aforementioned first and second audio interfaces.

In one embodiment, under control of the new macros, the acoustic echo cancelling software (436 or 536) is configured to generate a correction signal that mixes with the audio signals to reduce, eliminate, remove, or cancel an echo. The acoustic echo canceling software (436 or 536) and/or the new macros 308 may be provided on a recordable medium in the form of programming instructions. In one embodiment, the programming instructions are configured to be loaded onto the computer system (server 300 of FIGS. 4 or 5) for installing the acoustic echo canceling software and/or the new macros.

Figure 6:
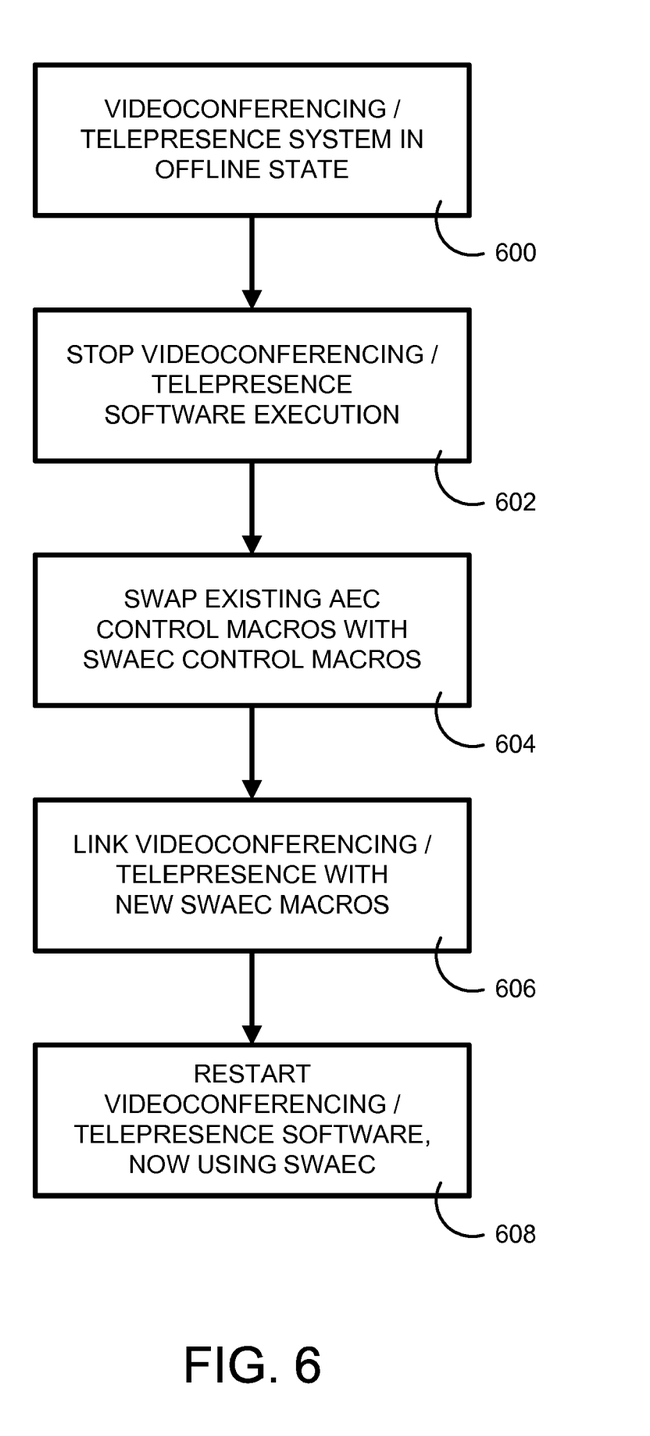
FIG. 6 is a flow chart showing one embodiment of a software based acoustic echo cancellation subsystem of the present invention that replaces a hardware based acoustic echo cancellation subsystem.

FIG. 6 is a flow chart detailing the process of replacing an existing hardware based acoustic echo cancellation subsystem of FIGS. 4 and 5 with a software based acoustic echo cancellation subsystem in one embodiment of the present invention that utilizes APIs. The process begins with the videoconferencing telepresence system in an offline, i.e not in use, state (step 600). As part of step 600, the software acoustic echo cancellation subsystems 336 or 436 are installed onto the server 300 of FIGS. 4 or 5). If the videoconferencing telepresence software is executing, it is shutdown (step 602). The current hardware MACRO 308 definitions are replaced with new software MACRO definitions408 (step 604). Note, the new MACRO definitions are configured to interface with the APIs 412 of the software acoustic echo cancellation subsystems 436 or 536 systems. The new MACROS 408 are linked to the existing video conferencing software (step606). The videoconferencing telepresence software is restarted (step 608). The software acoustic echo cancellation subsystems 336 or 436 are now utilized by the videoconferencing/telepresence system for echo cancellation.

Figure 7:
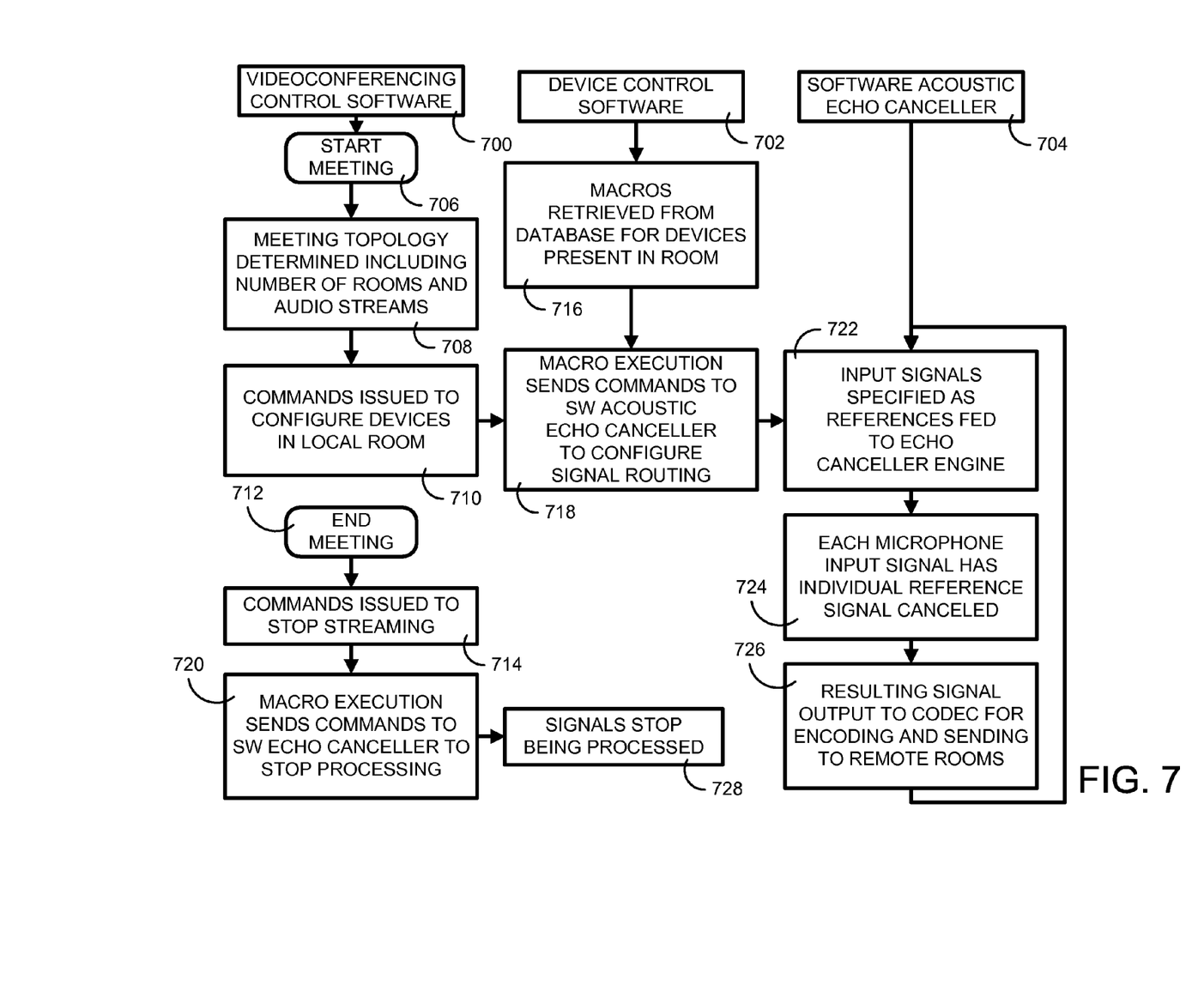
FIG. 7 is a flow diagram representing the subsystems of a studio participating in a videoconferencing or telepresence session, in which the studio is utilizing a hardware based echo cancellation subsystem.

FIG. 7 is a flow diagram representing the subsystems of a studio participating in a videoconferencing or telepresence session using one embodiment of the software echo cancellation subsystem of the present invention. The flow process under step 700 represents the execution flow of the videoconferencing or telepresence control software. The flow process under step 602 represents the execution flow of the device control software. The flow process under step 704 represents the execution flow of the software based echo cancellation system.

Referring to FIGS. 3-5 along with FIG. 7, after the videoconferencing control software 700 is initiated and after device control software 702 is initialized, MACROS are retrieved from a database for the devices present in the room (step 716). At some point after system initialization, a videoconference/telepresence session is initiated and the meeting starts (step 706), the meeting topology is determined, including the number of rooms (studios) and number of audio streams that will be involved in the conference (step 708). Commands are then issued to configure devices in local rooms (step 710). Upon reception of the commands, device control software 302 that is installed and implemented in an existing hardware acoustic echo cancellation system, sends commands to the software echo canceller 304 to configure signal routing.

The MACROS 408 of the software acoustic echo cancellation subsystem send commands to the software echo canceller 704 instead of a hardware echo canceller to configure signal routing (step 718). Upon receiving the commands, the software acoustic echo canceller 406 begins a continuous process of feeding input signals specified as references to the echo canceller engine as corrections signal (step 722). Using the correction signals, each microphone input has individual reference signals cancelled (step 724). The resulting audio signal is output to the audio codec for encoding and sending to remote rooms (studios) (step 726).

When the conference is ended, the videoconferencing software sends commands to stop streaming (step 714) to device control software 302. Upon reception of these commands, device control software 702 executes MACROS 408, which are now defined to control the software acoustic echo canceller 408, to stop processing (step 720). Upon receipt of the stop processing commands, the software acoustic echo canceller stop processing all signals (step 728).

Referring back to FIGS. 2-7, aspects of the present invention include upgraded video conference equipment, a method of upgrading, and software for upgrading to enable the replacement of a hardware based acoustic audio cancellation system with a software based acoustic cancellation (303, 436 or 536) system. In one embodiment, the upgraded video conference system can include a computer system having control software, acoustic echo cancelling software, and macros configured to be executed by the control software to control the acoustic echo cancelling software.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A computer-readable program contained in a computer-readable medium for installation into a computer operating a video conferencing system having control software, the computer-readable program configured to execute instructions causing the following steps to occur, comprising:

upgrading an existing echo canceling system with a software-based acoustic canceling system, wherein the software-based acoustic canceling system includes macros having a same syntax as macros in the existing echo canceling system and different definitions for operating the software-based acoustic canceling system;

providing a configurable command set for the software-based acoustic canceling system that allows real time operating parameter changes during a video conferencing session;

defining an application programming interface for the software-based acoustic canceling system; and installing user configurable control software with the macros of the software-based acoustic canceling system configured to execute high level commands that are linked to the application programming interface for enabling the control software to have access to the command set.

2. The computer-readable program of claim 1, wherein the macros of the software-based acoustic canceling system replace existing macros.

3. The computer-readable program of claim 2, wherein the macros of the software-based acoustic canceling system emulate functions of the existing macros to enable an upgrade with less disruption of the video conferencing system.

4. The computer-readable program of claim 1, further comprising:

an audio interface that is configured to transmit and receive audio signals, wherein the acoustic echo cancelling software is configured to generate a correction signal that mixes with the audio signals to reduce an echo from the audio signals.

5. The computer-readable program of claim 4, wherein the audio interface includes:

a first audio interface that interfaces with local audio input and output devices and with the acoustic echo cancelling software; and a second audio interface that interfaces with the acoustic echo canceling software.

6. The computer-readable program of claim 1, wherein the command set is configured to provide real time adjustment of echo canceling parameters to accommodate audio topology changes during a video conferencing session.

7. The computer-readable program of claim 1, wherein the command set is configured to diagnose and troubleshoot unexpected states during a video conferencing session.

8. The computer-readable program of claim 1 wherein providing a configurable command set for the software-based acoustic canceling system that allows real time operating parameter changes during a video conferencing session includes dynamically compensating for changes in audio topologies during the video conferencing session.

9. The computer-readable program of claim 1 wherein providing a configurable command set for the software-based acoustic canceling system that allows real time operating parameter changes during a video conferencing session includes diagnosing and troubleshooting errors of the video conference system.

10. The computer-readable program of claim 1 wherein providing a configurable command set for the software-based acoustic canceling system that allows real time operating parameter changes during a video conferencing session includes recovering previously known working states for the video conferencing system.

11. The computer-readable program of claim 1 wherein the macros are configured to emulate functions provided by hardware components of the video conferencing system while an upgrade to the echo canceling system is being performed.

* * * * *